(12) United States Patent
Flock et al.

(10) Patent No.: US 10,005,379 B2
(45) Date of Patent: Jun. 26, 2018

(54) METHOD FOR PRODUCING A COMPONENT AND COMPONENT

(71) Applicant: Johnson Controls Technology Company, Holland, MI (US)

(72) Inventors: Dustin Flock, Köln (DE); Bernd Meier, Attendorn (DE); Vedat Nuyan, Wuppertal (DE); Axel Koever, Köln (DE)

(73) Assignee: ADIENT LUXEMBOURG HOLDING S.À.R.L., Luxembourg (LU)

( * ) Notice: Subject to any disclaimer, the term of this patent is extended or adjusted under 35 U.S.C. 154(b) by 743 days.

(21) Appl. No.: 14/374,450

(22) PCT Filed: Jan. 25, 2013

(86) PCT No.: PCT/EP2013/051456
§ 371 (c)(1),
(2) Date: Jul. 24, 2014

(87) PCT Pub. No.: WO2013/110770
PCT Pub. Date: Aug. 1, 2013

(65) Prior Publication Data
US 2014/0377498 A1    Dec. 25, 2014

(30) Foreign Application Priority Data

Jan. 25, 2012 (DE) .................. 10 2012 201 043
Mar. 14, 2012 (DE) .................. 10 2012 204 036

(51) Int. Cl.
*B60N 2/68* (2006.01)
*B29D 23/00* (2006.01)
(Continued)

(52) U.S. Cl.
CPC ........ *B60N 2/686* (2013.01); *B29C 45/14631* (2013.01); *B29C 45/1704* (2013.01);
(Continued)

(58) Field of Classification Search
CPC ......... B60N 2/686; B60N 2/68; Y10T 428/24; B29C 45/14631; B29C 70/446;
(Continued)

(56) References Cited

U.S. PATENT DOCUMENTS 9,422,024 B2 * 8/2016 Al-Sheyyab ........... B62K 19/16
2009/0011213 A1 * 1/2009 Tripathi ............ B29C 45/14811
428/293.4

FOREIGN PATENT DOCUMENTS

DE      197 47 021 A1      4/1999
DE      19747021 B4 * 12/2007 ....... B29C 45/14631
(Continued)

OTHER PUBLICATIONS

Written Opinion of the International Searching Authority issued in International Application No. PCT/EP2013/051456.*
(Continued)

*Primary Examiner* — Philip Tucker
*Assistant Examiner* — Vicki Wu
(74) *Attorney, Agent, or Firm* — Foley & Lardner LLP

(57) ABSTRACT

A component having at least one structural component and one organic sheet, and a method for producing the component, are described. In a first step, a woven-fabric hose is arranged in a contour of a tool and then the tool is closed. In a second step, a plastic, in particular a melt, is injected into the woven-fabric hose arranged in the closed tool. In a third step, a fluid and/or supporting element is introduced into the woven-fabric hose, a cavity thus being formed in the woven-fabric hose. An organic sheet is formed and backmolded with a plastic, and the formed and backmolded
(Continued)

Figure 2:
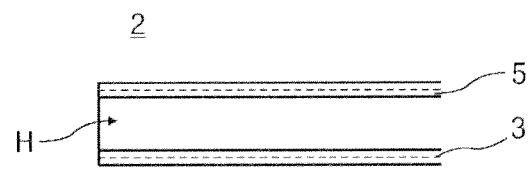

organic sheet is bonded to the structural component to produce the component.

6 Claims, 2 Drawing Sheets

(51) Int. Cl.
    *B29C 45/14* (2006.01)
    *B29C 70/44* (2006.01)
    *B29C 45/17* (2006.01)
    *B29C 69/00* (2006.01)
    *B29L 31/30* (2006.01)
    *B29C 65/00* (2006.01)
    *B29C 65/02* (2006.01)
    *B29L 23/00* (2006.01)

(52) U.S. Cl.
    CPC ............ *B29C 69/00* (2013.01); *B29C 70/446* (2013.01); *B29D 23/00* (2013.01); *B60N 2/68* (2013.01); *B29C 45/14* (2013.01); *B29C 65/02* (2013.01); *B29C 66/532* (2013.01); *B29C 66/72141* (2013.01); *B29C 66/7392* (2013.01); *B29C 66/73921* (2013.01); *B29L 2023/00* (2013.01); *B29L 2031/3055* (2013.01); *Y10T 428/24* (2015.01)

(58) Field of Classification Search
    CPC .............. B29C 45/1704; B29C 66/532; B29C 66/7392; B29C 66/73921; B29C 69/00; B29C 45/14; B29C 65/02; B29C 66/72141; B29L 2031/3055; B29L 2023/00; B29D 23/00
    USPC ........................................................ 156/245
    See application file for complete search history.

(56) References Cited

FOREIGN PATENT DOCUMENTS

| DE | 1020070 36 660 A1 | 2/2009 | |
| DE | 1020080 46 602 A1 | 3/2010 | |
| DE | 102008046602 A1 * | 3/2010 | ....... B29C 45/14631 |
| JP | 04-259530 A | 9/1992 | |
| JP | 05-104571 A | 4/1993 | |
| JP | 2001-301532 A | 10/2001 | |
| WO | WO-00/78532 A1 | 12/2000 | |
| WO | WO 0078532 A1 * | 12/2000 | ............ B29C 45/16 |

OTHER PUBLICATIONS

Haberstroh E Et Al: "Mit Gasdruck Zu Lsrformteilen Mit Funktionellen Hohlraeumen", Fachtagung Siliconelastomere—Innovative Werkstoffe Fuer Dasneue Jahrtausend, XX, XX, Apr. 4, 2001 (Apr. 4, 2001), pp. K/02-K/12J, XPOOI 157859.*
Lanxess: "Technische Information: Organoblech-die Innovation in der Hybridtechnik, Geringes Gewicht und hohe Festigkeit", Internet Citation, Feb. 25, 2009 (Feb. 25, 2009), pp. 1-2, XP002664236.*
Rolf Leonard: "Einsatz von Organoblech forciert den Leichtbau in der Hybridtechnik; Bauteile immer komplexer und leichter", Internet Citation, Aug. 23, 2010 (Aug. 23, 2010), p. 1, XP002664235.*
Douglas A. Mccarville et al: "Processing and joining of thermoplastic composites" In: "Composites", Dec. 1, 2001 (Dec. 1, 2001), ASM International, USA, XP055066726, ISBN: 978-0-87-170703-1 pp. 633-645.*
Office Action dated Nov. 12, 2015, in corresponding Korean application No. 10-2014-7023730, and English translation, 8 pages.
Office Action dated May 26, 2015, received in corresponding Japanese Application No. 2014-551653, 3 pages.
Leonard, Rolf: "Einsatz von Organoblech forciert den Leichtbau in der Hybridtechnik; Bauteile immer komplexer und leichter" Internet Citation, Aug. 23, 2010, 1 page, http://www.autokon.de/home/-/article/16537511//Bauteile-0,er-komplexer-und-leichter/art_co_INSTANCE 0000/maximized/.
Lanxess: "Technische Information: Organoblech—die Innovation in der Hybridtechnik, Geringes Gewicht und hohe Festigkeit", Internet Citation, Feb. 25, 2009, XP-002664236, 2 pages, URL:http://techcenter.1anxess.com/scp/emea/de/docguard/TI_2009-003_DE_Organoblech.pdf?docId-12427922.
Haberstroh, E. et al.: "Mit Gasdruck zu LSR-Formteilen mit funktionellen Hohlraumen", Fachtagung Siliconelastomere-Innovative Werkstoffe Fuer Dasneue Jahrtausend, XX, XX, K/02-K/12, I, 12 pages, XP-001157859, Apr. 4, 2001.
McCarville, Douglas A. et al.: "Processing and Joining of Thermoplastic Composites", Boeing Military Aircraft & Missile Systems, Dec. 1, 2001 (Dec. 1, 2001), ASM International, USA, XP055066726, 13 pps,633-645.
Office Action dated Aug. 21, 2012 in corresponding German Application No. 10 2012 204 036.6.
International Search Report in PCT/EP2013/051456.

* cited by examiner

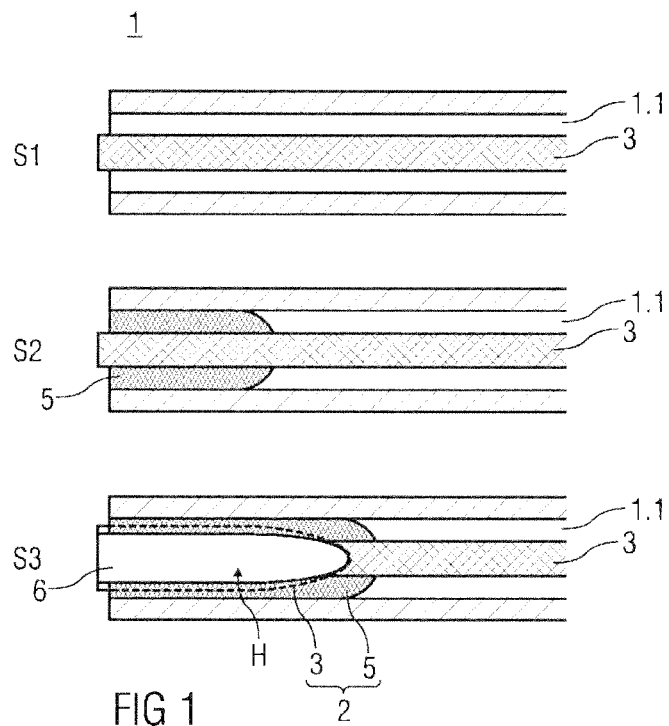
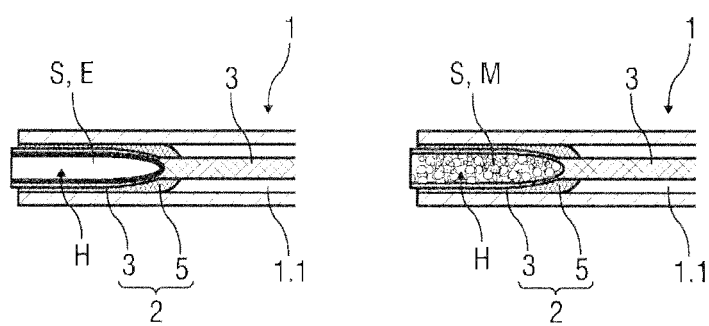
FIG 1
FIG 1A   FIG 1B

METHOD FOR PRODUCING A COMPONENT AND COMPONENT

CROSS REFERENCE TO RELATED APPLICATIONS

The present application is a U.S. National Stage of International Application No. PCT/EP2013/051456 tiled on Jan. 25, 2013, which claims the benefit of German Patent Application Nos. 10 2012 201 043.2 filed on Jan. 25, 2012 and 10 2012 204 036.6 filed on Mar. 14. 2012, the entire disclosures of all of which are incorporated herein by reference.

The invention relates to a method for producing a component formed at least from a structural component and an organometallic sheet according to the preamble of patent claim 1 and to a component produced by the method.

Structural components comprising fiber composite structures, for example those known as organometallic sheets, are continuous fiber-reinforced thermoplastic sheets and are known in the prior art, for example for the production of seat-back rear walls. For example, an organometallic sheet is correspondingly shaped in a mold and subsequently provided with functional elements, such as for example ribs, which are preferably molded on. For the production of structural components in the form of hollow bodies, there is a known method referred to as the fit-hybrid method, by means of which the shaping of an organometallic sheet and simultaneous injection-molding are possible in one processing step. The profiles are usually closed by means of a subsequent adhesive bonding process.

In this respect, DE 197 47 021 B4 discloses a method for injection molding continuous fiber-reinforced hollow bodies, devices being used for positioning and fixing tubular braids of any kind desired in one or more layers in an injection mold in such a way that, when the plastics melt is injected into the braids, they a) are flowed through by the plastics melt from the inside out, and these braids are thus completely embedded in plastic, and a cavity is subsequently created by any kind of gas injection method desired, or that, by using correspondingly dense braids, they b) are not flowed through by the plastics melt but are brought to bear against the mold walls by the injection and follow-up pressure of the melt in such a way that these braids form the outer skin of the molding and a cavity is subsequently created by any kind of gas injection method desired.

A method for producing a component with a hollow profile is described in DE 10 2008 046 602 A1. In the method, a fiber-reinforced tube is placed into an injection mold, a molding material is injected into the injection mold, the fiber-reinforced tube being encapsulated by the molding material, and an injection method is then used to remove excess molding material in the portion of the component that is configured as a hollow profile.

DE 10 2007 036 660 A1 discloses a method and a device for producing a reinforced composite product in an injection-molding machine having a plasticizing and injecting arrangement and a closing unit, in which at least one mold is accommodated. In this case, a woven material is placed into an opened mold, the mold is closed and the woven material is thereby shaped in a first cavity, the woven material being completely consolidated under the effect of heat. The mold is opened, the shaped fully consolidated product is turned over, the mold is closed to form a second cavity, enlarged in comparison with the first cavity, and the plastics material is introduced into the second cavity, the shaped, fully consolidated woven fabric bonding to the injection-molded matrix material.

The object of the present invention is to provide a method for producing a component formed at least from a structural component and an organometallic sheet that is improved in comparison with the prior art, and in particular is less costly.

With regard to the method, the object is achieved according to the invention by the features specified in claim 1.

In the case of a method for producing a component formed from at least a structural component and an organometallic sheet, in a first step, a woven-fabric tube is arranged in a contour of a mold and then the mold is closed, furthermore, in a second step, a plastic, in particular a melt, is injected into the woven-fabric tube arranged in the closed mold and, in a third step, a fluid and/or a supporting element is introduced into the woven-fabric tube to form a cavity in the woven-fabric tube. The plastic, in particular the melt, is preferably a liquid plastic, for example a thermoplastic or thermoset, at a temperature lying appropriately above its melting point. After the plastic, in particular the melt, has cooled down, it forms a hollow structural component together with embedded fibers of the woven-fabric tube. In addition, an organometallic sheet is shaped and backmolded with a plastic, the shaped and at least in certain regions backmolded organometallic sheet being connected to the hollow structural component in a material-bonded manner to form the component.

The fluid and/or the supporting element preferably has a low temperature, so that the plastic, in particular the melt, cools down after introduction of the fluid into the woven-fabric tube. Consequently, the fibers of the woven-fabric tube are embedded in the cooled-down plastic, for example in the cooled-down melt, whereby a continuous fiber-reinforced, thermoplastic structural component with a hollow body profile is produced. Consequently, by means of the method, the production of a hollow body profile is possible without an additional joining method, the structural component advantageously having a comparatively high torsional rigidity on the basis of the closed hollow profile. Consequently, the structural component is reduced in weight and flexurally particularly rigid in comparison with structural components with an open profile.

In a preferred embodiment of the invention, the fluid is introduced into the woven-fabric tube at a predeterminable pressure, whereby the injected plastic or the injected melt is made to flow through the woven-fabric tube and distributes itself, preferably uniformly, in particular into the wall of the woven-fabric tube, whereby the woven-fabric tube is embedded further into the plastic or into the melt. The fluid is, for example, water. Alternatively, an inflatable enveloping element, for example a balloon, is introduced as a supporting element into an open end of the woven-fabric tube and is inflated there by means of a fluid, in particular a cold fluid, for example air, gas or water, at a predeterminable pressure in such a way that a cavity is made to evolve in the woven-fabric tube. In other words: the woven-fabric tube is appropriately inflated along its longitudinal extent, to form an elongate cavity, and supported, so that the woven-fabric tube is embedded further into the already injected plastic or the already injected melt, until the plastic or the melt has cooled down together with the embedded fibers of the woven-fabric tube. The supporting element may subsequently be removed, or else remain in the structural component.

A further alternative provides that a supporting material, such as for example a foam material, is introduced as a supporting element into an open end of the woven-fabric tube to make the cavity evolve in the woven-fabric tube. The foam material expediently remains in the structural component.

To optimize the structural component with regard to the torsional rigidity, it is combined with an organometallic sheet. For this purpose, according to the invention, an organometallic sheet is shaped, backmolded with a plastic, at least in certain regions or completely, and then connected to the structural component in a material-bonded manner. In this case, the organometallic sheet is backmolded with plastic in such a way that a reinforcing structure, for example a rib structure, is formed.

In order to ensure an optimum material-bonded connection between the structural component and the organometallic sheet, the organometallic sheet is heated, at least in certain regions.

To produce the structural component, a device is provided, with a mold by means of which, according to the invention, a woven-fabric tube can be arranged in a contour of the mold and the mold can subsequently be closed. Furthermore, a plastic, in particular a melt, can be injected into the woven-fabric tube arranged in the closed mold and a fluid can be introduced into the woven-fabric tube. The mold is preferably formed as a combination mold for the shaping and backmolding of a structural component to be produced.

A component produced by the method comprises at least one structural component, formed from a cooled-down plastic or a cooled-down melt with embedded fibers of a woven-fabric tube, and an organometallic sheet that has been shaped and backmolded with a plastic and is connected to the structural component in a material-bonded manner.

A structural component with a closed hollow profile, and consequently a continuous fiber-reinforced structural component with a hollow body profile, which has a comparatively high planar moment of inertia, can be produced by means of the device. As a result, for example, a member of a seat-back rear wall can be made narrower than a member with an open profile, whereby material and weight savings are possible. The seat-back rear wall can be produced more easily and inexpensively. Moreover, a seat structure can be designed and produced appropriately for the given loading.

Figure 3:
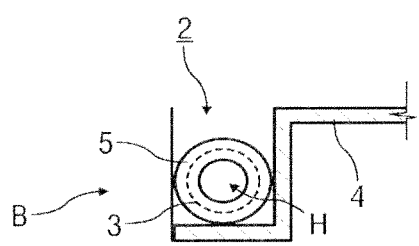
Figure 4:
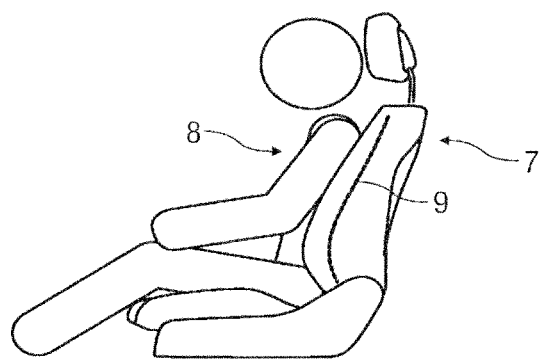

The invention is explained in more detail on the basis of the accompanying schematic figures, in which:

FIG. 1 schematically shows a sectional representation of a device according to the invention for producing a structural component after a first, second and third step, FIGS. 1A, 1B schematically show various supporting elements for making a cavity evolve in the structural component in the third step, FIG. 2 schematically shows a sectional representation, in particular a longitudinal section, of a structural component, FIG. 3 schematically shows a further sectional representation, in particular a cross section, of the structural component connected to an organometallic sheet to form a component, and FIG. 4 schematically shows a perspective view of a vehicle seat with a vehicle occupant positioned on it.

Parts that correspond to one another are provided with the same reference signs in all of the figures.

FIG. 1 schematically shows a sectional representation, in particular a longitudinal section, of a device 1 for producing a structural component 2. FIG. 2 schematically shows a longitudinal section of the structural component 2 and FIG. 3 shows a cross section of the structural component 2, the structural component being connected to an organometallic sheet 4 and forming a component B. An organometallic sheet 4 is a sheet-like semifinished product of a thermoplastic material into which a woven fabric of glass, carbon and/or aramid fibers or a mixed form of these has been introduced in such a way that the fibers are completely wetted with thermoplastic material. Organometallic sheets 4 are consequently continuous fiber-reinforced thermoplastic sheets.

FIG. 1 illustrates the device 1 during a first step S1, a second step S2 and a third step S3 (viewed from top to bottom).

In the present exemplary embodiment, the device 1 comprises a mold 1.1, which is preferably formed as a combination mold comprising a thermoforming mold and an injection mold. For example, the mold 1.1 is formed as a two-part, cavity-forming composite body, which comprises a first mold body and a second mold body. In this case, one of the mold bodies has a shaping profile as a positive contour of the structural component 2 to be produced and the other of the mold bodies has an appropriately corresponding recess. The positive contour and the recess thereby form the cavity of the mold 1.1.

The mold 1.1 is preferably formed from a metal or a metal alloy. Alternatively, the mold 1.1 is formed from a ceramic or a plastic, the mold 1.1 being provided for this purpose with a metal coating, at least in the region of the cavity.

In the first step S1, a woven-fabric tube 3 is placed into the positive contour of the mold 1.1. Then the mold 1.1 is closed. The closing of the mold 1.1 may in this case take place manually or preferably in an automated manner.

In the second step S2, a liquid plastic, for example in the form of a melt 5, is injected into the woven-fabric tube 3 arranged in the closed mold 1.1. For this purpose, the device 1 comprises an injection machine (not represented any more specifically), which can be manually actuated or operates in an automated manner.

The melt 5 is for example a liquid plastic, at a temperature lying appropriately above its melting point, for example between 100 degrees Celsius and 200 degrees Celsius. Particularly suitable for this are single-phase, non-water-soluble thermoplastics, for example polyamide, polyolefin, polypropylene, or thermosets, for example polyurethane.

In the third step S3, a fluid 6, for example water, is introduced into the woven-fabric tube 3 at an appropriately low temperature and appropriately high pressure, so that the already injected melt 5 distributes itself, preferably uniformly, on the and/or into the woven-fabric tube 3 on the outer and/or inner wall of the woven-fabric tube 3. After introduction of the fluid 6 into an open end of the woven-fabric tube 3 to make a cavity H evolve, the fibers of the woven-fabric tube 3 lie embedded in the cooled-down melt 5. This produces a continuous fiber-reinforced, thermoplastic structural component 2 with a hollow body profile along the positive contour of the mold 1.1.

FIGS. 1A and 1B show alternative embodiments for the evolution of the cavity H by means of a supporting element S. The supporting element S according to FIG. 1A is formed as an inflatable enveloping element E, for example a balloon.

The enveloping element E is introduced into an open end of the woven-fabric tube 3 already surrounded with melt 5 and is inflated under a predetermined pressure with a fluid 6, for example air, water or gas, so that a cavity H is made to evolve in the woven-fabric tube 3 along its longitudinal extent. After the melt 5 with the embedded woven-fabric tube 3 has cooled down, the enveloping element E can be removed, or if appropriate may remain, and then forms for example an inner wall of the hollow structural component 2.

In FIG. 1B, a supporting material M, for example a foam material, can be introduced into an open end of the woven-fabric tube 3 as an alternative supporting element S.

In a further step (not represented any more specifically), the organometallic sheet 4 is shaped and a surface of the organometallic sheet 4 is backmolded with a reinforcing structure, preferably a rib structure. The rib structure is preferably formed from the same thermoplastic material as the organometallic sheet 4. Consequently, an integrated, and consequently one-piece, component is formed from the organometallic sheet 4 and the rib structure.

The bonding of the organometallic sheet 4 to the structural component 2 preferably takes place by way of the thermoplastic matrix of the organometallic sheet 4 and/or the thermoplastically reinforced surface of the structural component 2 that is facing the organometallic sheet 4, the thermoplastic matrix being appropriately heated, so that the structural component 2 enters into a material-bonded connection with the organometallic sheet 4. In other words, a superficial fusion takes place between the structural component 2 and the organometallic sheet 4.

The closed hollow profile gives the structural component 2 a comparatively high torsional rigidity. Consequently, the structural component 2 is reduced in weight and flexurally particularly rigid in comparison with structural component 2 with open profiles. For example, the structural component 2 is consequently suitable for the production of a seat-back rear wall for a vehicle seat 7.

FIG. 4 shows in a perspective view a vehicle seat 7, given by way of example, with a vehicle occupant 8 positioned on it.

For example, a seat-back rear wall of the vehicle seat 7 can be produced by means of the structural component 2 and the organometallic sheet 4, it being possible for headrest sleeves, belt deflectors and/or a mounting for a belt retractor device to be formed in the molded-in rib structure of the organometallic sheet 4.

Alternatively or in addition, it is possible to arrange the structural component 2 in a channel 9 arranged in the vehicle seat cover, known as a trim channel.

LIST OF REFERENCE SIGNS 1 device
1.1 mold
2 structural component
3 woven-fabric tube
4 organometallic sheet
5 melt
6 fluid
7 vehicle seat
8 vehicle occupant
9 channel
B component
E enveloping element
H cavity
M supporting material
S supporting element
S1 first step
S2 second step
S3 third step

The invention claimed is:

1. A method for producing a component formed at least from a structural component and an organometallic sheet, comprising:
    forming a hollow structural component by:
        arranging a woven-fabric tube in a contour of a mold and then closing the mold,
        injecting an at least partially melted plastic into the closed mold in which the woven-fabric tube is arranged, and
        introducing a fluid and/or a supporting element into the woven-fabric tube to form a cavity in the woven-fabric tube and embed fibers of the woven-fabric tube in the plastic, such that, after the plastic has cooled down, the hollow structural component is formed with embedded fibers of the woven-fabric tube; and
    shaping and backmolding an organometallic sheet with a plastic; and
    bonding the shaped and backmolded organometallic sheet to the hollow structural component to form the component.

2. The method as claimed in claim 1, wherein the fluid and/or the supporting element is introduced at a predeterminable pressure.

3. The method as claimed in claim 1, wherein the fluid and/or the supporting element is introduced into the woven-fabric tube, in such a way that the woven-fabric tube is embedded further into the already injected plastic, at least in certain regions.

4. The method as claimed in claim 1,
    wherein the organometallic sheet is heated, at least in certain regions.

5. The method as claimed in claim 1,
    wherein the organometallic sheet is backmolded with a plastic in such a way that a rib structure is formed.

6. The method as claimed in claim 1,
    wherein, after the plastic, in which the woven-fabric tube is embedded, has cooled down, a continuous fiber-reinforced structural component with a hollow body profile is formed.

* * * * *